United States Patent
Uno et al.

(10) Patent No.: US 9,701,547 B2
(45) Date of Patent: Jul. 11, 2017

(54) ION EXCHANGER, WATER TREATMENT DEVICE PROVIDED WITH SAME, AND HOT WATER SUPPLY DEVICE

(71) Applicant: Panasonic Intellectual Property Management Co., Ltd., Osaka (JP)

(72) Inventors: Katsuhiko Uno, Nara (JP); Mitsuhiro Sano, Shiga (JP); Yuji Nakata, Shiga (JP); Muneto Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 189 days.

(21) Appl. No.: 14/419,836

(22) PCT Filed: Dec. 6, 2013

(86) PCT No.: PCT/JP2013/007174
§ 371 (c)(1),
(2) Date: Feb. 5, 2015

(87) PCT Pub. No.: WO2014/091726
PCT Pub. Date: Jun. 19, 2014

(65) Prior Publication Data
US 2015/0225258 A1  Aug. 13, 2015

(30) Foreign Application Priority Data

Dec. 14, 2012  (JP) .................................. 2012-273171
Jun. 3, 2013  (JP) .................................. 2013-116805

(51) Int. Cl.
*C02F 1/42* (2006.01)
*B01J 47/12* (2017.01)
(Continued)

(52) U.S. Cl.
CPC .............. *C02F 1/42* (2013.01); *B01D 15/362* (2013.01); *B01D 15/363* (2013.01); *B01J 39/05* (2017.01);
(Continued)

(58) Field of Classification Search
CPC ........................... C02F 1/42; C02F 2001/422; C02F 2001/425; C02F 2303/16; C02F 2303/22;
(Continued)

(56) References Cited

U.S. PATENT DOCUMENTS

| 5,788,826 A | 8/1998 | Nyberg |
| 2006/0016685 A1 | 1/2006 | Hawkins et al. |
| 2008/0057398 A1 | 3/2008 | Wei et al. |

FOREIGN PATENT DOCUMENTS

| JP | 7-204429 | 8/1995 |
| JP | 2001-509074 | 7/2001 |

(Continued)

*Primary Examiner* — Matthew O Savage
(74) *Attorney, Agent, or Firm* — Hamre, Schumann, Mueller & Larson, P.C.

(57) ABSTRACT

An ion exchanger includes a sheet-shaped positive ion exchanger 2 in which binder particles 5 and positive ionic exchange resin particles 4 are mixed with each other, and a sheet-shaped porous negative ion exchanger 3 in which binder particles 7 and negative ionic exchange resin particles 6 are mixed with each other, the positive ion exchanger 2 and the negative ion exchanger 3 are bonded to each other to form an interface, and capacity of the negative ion exchanger 3 is greater than that of the positive ion exchanger 2. Therefore, the porous ion exchanger 1 is formed and absorbing ability of ion is increased, capacity of the negative ion exchanger 3 is made greater than that of the positive ion exchanger 2, regenerating ability of the ion exchanger with
(Continued)

18    Through holes respect to absorbing ability of ion can be secured, and ion absorption and regeneration processing is carried out efficiently.

9 Claims, 10 Drawing Sheets

(51) Int. Cl.
| | |
|---|---|
| F24D 17/02 | (2006.01) |
| F24D 19/00 | (2006.01) |
| B01D 15/36 | (2006.01) |
| B01J 47/04 | (2006.01) |
| B01J 47/028 | (2017.01) |
| B01J 47/08 | (2006.01) |
| B01J 39/05 | (2017.01) |
| B01J 39/07 | (2017.01) |
| B01J 41/05 | (2017.01) |
| B01J 41/07 | (2017.01) |
| B01J 47/018 | (2017.01) |
| B01J 49/08 | (2017.01) |
| B01J 49/09 | (2017.01) |
| B01J 49/18 | (2017.01) |
| B01J 49/20 | (2017.01) |
| B01J 49/30 | (2017.01) |
| B01J 49/75 | (2017.01) |

(52) U.S. Cl.
CPC ............... *B01J 39/07* (2017.01); *B01J 41/05* (2017.01); *B01J 41/07* (2017.01); *B01J 47/018* (2017.01); *B01J 47/028* (2013.01); *B01J 47/04* (2013.01); *B01J 47/08* (2013.01); *B01J 47/12* (2013.01); *B01J 49/08* (2017.01); *B01J 49/09* (2017.01); *B01J 49/18* (2017.01); *B01J 49/20* (2017.01); *B01J 49/30* (2017.01); *B01J 49/75* (2017.01); *F24D 17/02* (2013.01); *F24D 19/0092* (2013.01); *C02F 2001/422* (2013.01); *C02F 2001/425* (2013.01); *C02F 2001/427* (2013.01); *C02F 2303/16* (2013.01); *C02F 2303/22* (2013.01)

(58) Field of Classification Search
CPC ........ B01J 39/05; B01J 49/75; B01J 49/0086; B01J 47/018; B01J 47/007; B01J 49/08; B01J 49/0017; B01J 49/30; B01J 49/0052; B01J 47/028; B01J 47/08; B01J 47/12; F24D 17/02; F24D 19/0092
See application file for complete search history.

(56) References Cited

FOREIGN PATENT DOCUMENTS

| | | | |
|---|---|---|---|
| JP | 2008-507406 | 3/2008 | |
| JP | 2009-233556 | 10/2009 | |
| JP | 2009-235417 | 10/2009 | |
| JP | 2010-502435 | 1/2010 | |
| JP | 2012-228669 | 11/2012 | |
| JP | 2012-236171 | 12/2012 | |
| JP | 2012-236172 | 12/2012 | |
| JP | EP 2620216 A1 * | 7/2013 | ............... C02F 1/42 |
| WO | 2010/089807 | 8/2010 | |
| WO | 2010/150534 | 12/2010 | |
| WO | 2012/039127 | 3/2012 | |
| WO | 2012/157236 | 11/2012 | |

* cited by examiner

[Fig. 1]
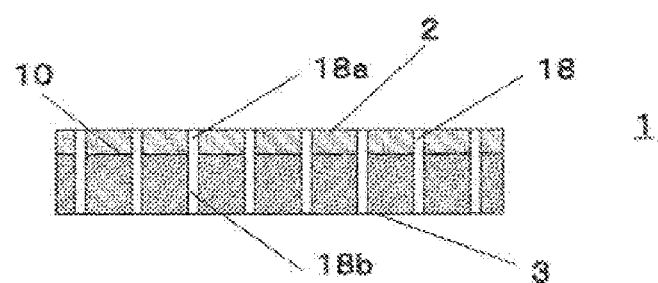
| 1 | Ion exchanger |
| 2 | Positive ion exchanger |
| 3 | Negative ion exchanger |
| 10 | Interface |
| 18 | Through hole |

[Fig. 2]
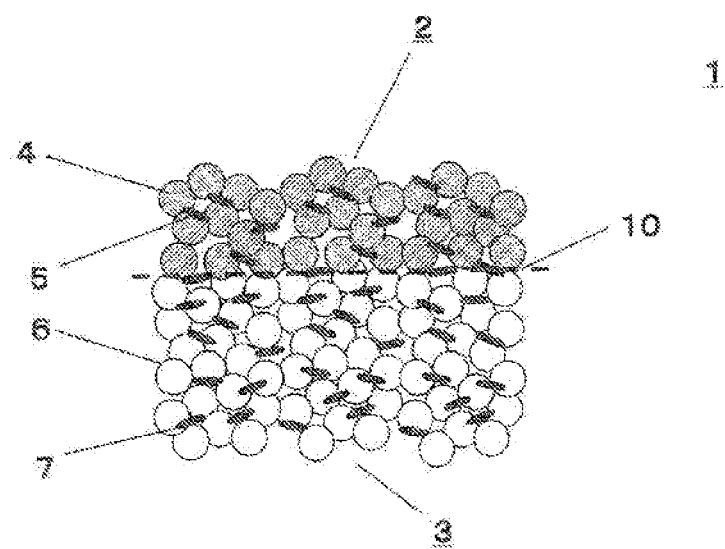
| | |
|---|---|
| 4 | Positive ionic exchange resin particles |
| 5 | Binder particles |
| 6 | Negative ionic exchange resin particles |
| 7 | Binder particles |
| 10 | Interface |

[Fig. 3]
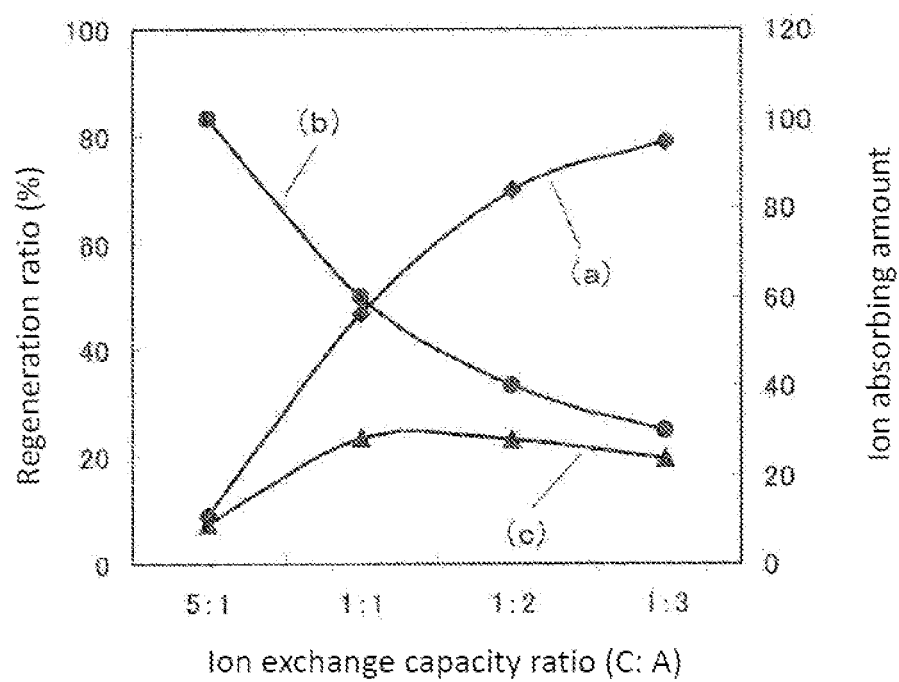

[Fig. 4]
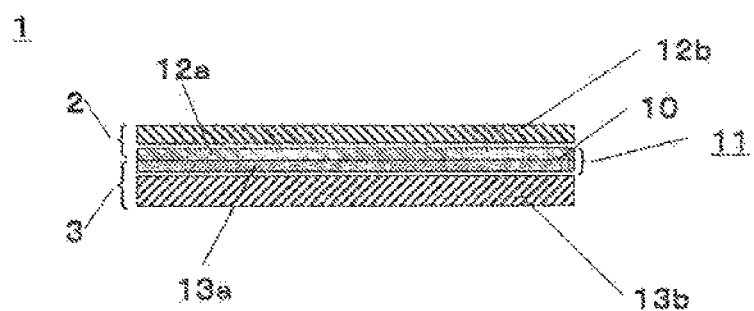
| 11 | Two-layer composition |
| 12a | First positive ion exchanger |
| 12b | Second positive ion exchanger |
| 13a | First negative ion exchanger |
| 13b | Second negative ion exchanger |

[Fig. 5]
(a)
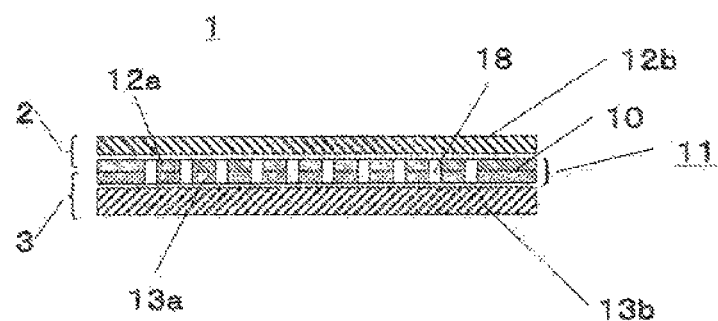
(b)
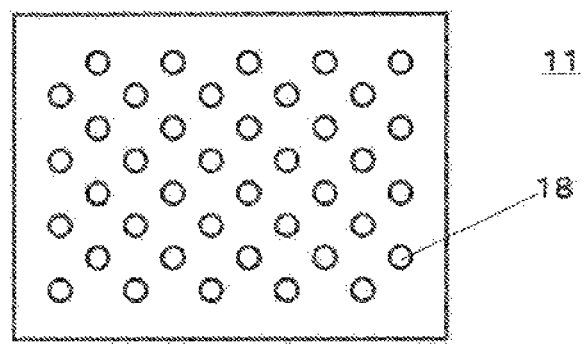
18    Through holes

[Fig. 6]
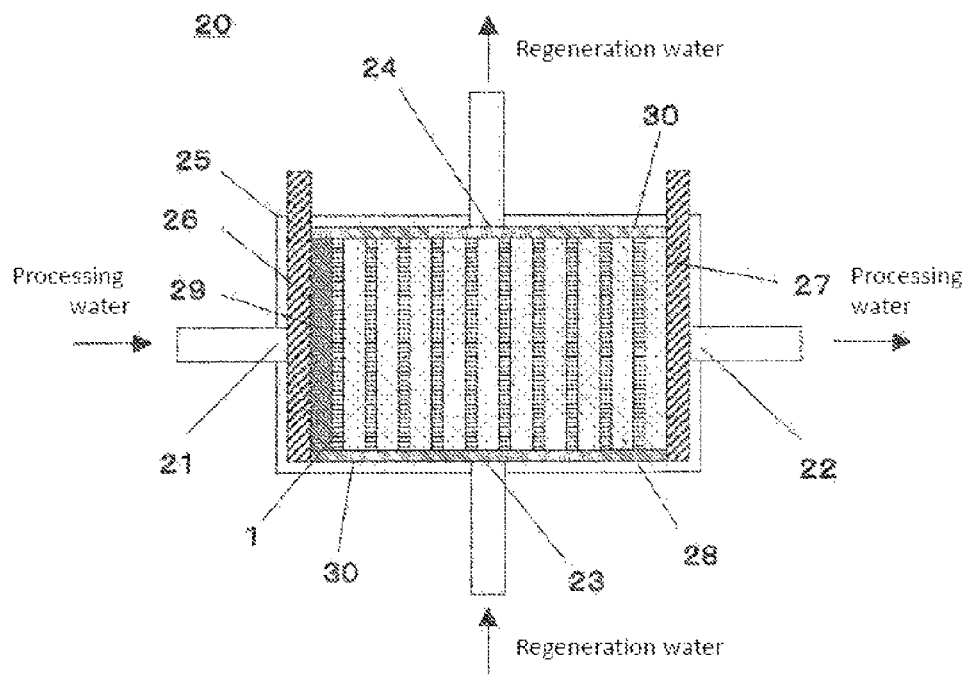
| | |
|---|---|
| 20 | Water softening device (Water treatment device) |
| 21 | Processing water inlet |
| 22 | Processing water outlet |
| 23 | Regeneration water inlet |
| 24 | Regeneration water outlet |
| 25 | Casing |
| 26 | Positive electrode |
| 27 | Negative electrode |

[Fig. 7]
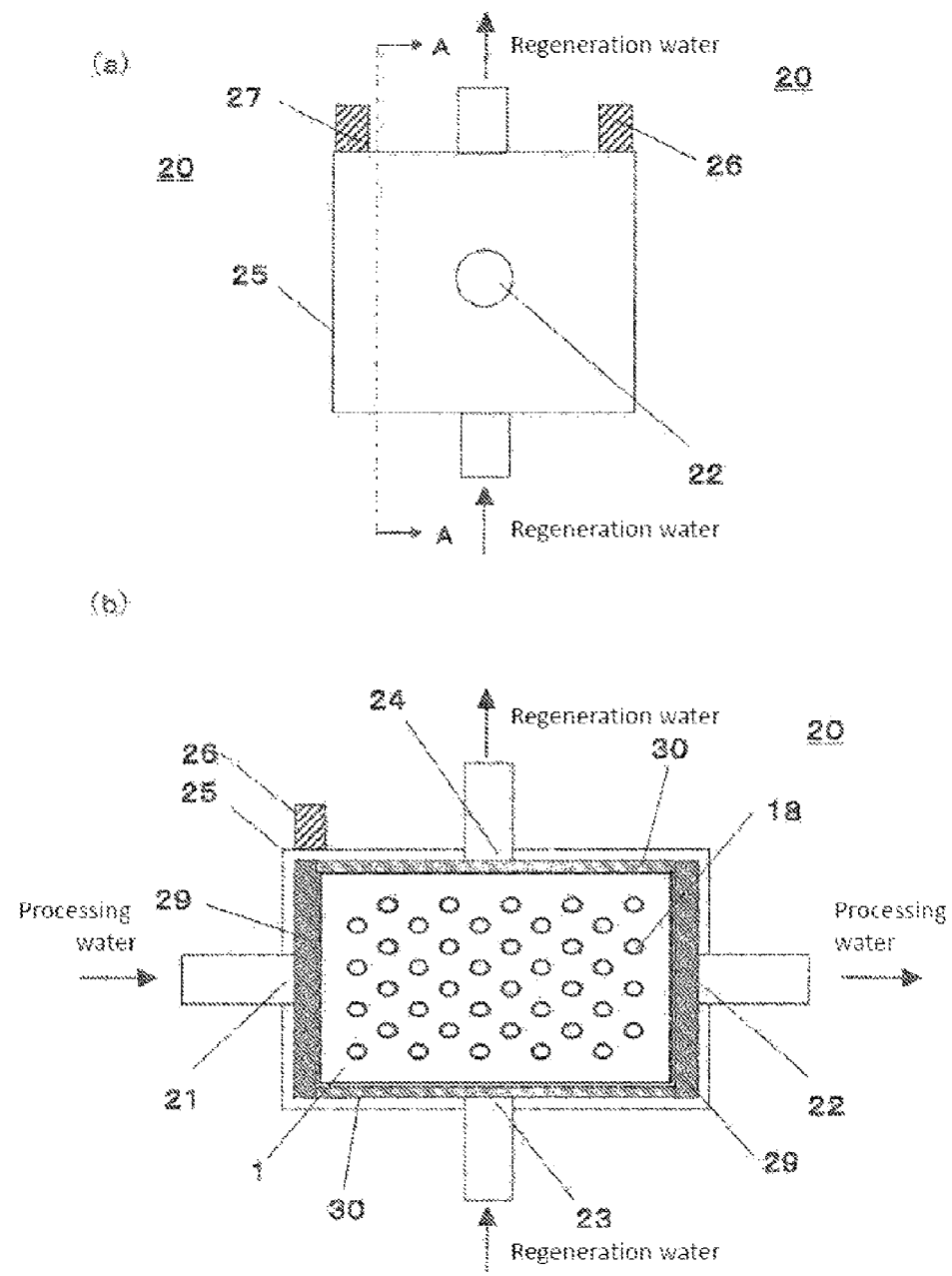

[Fig. 8]
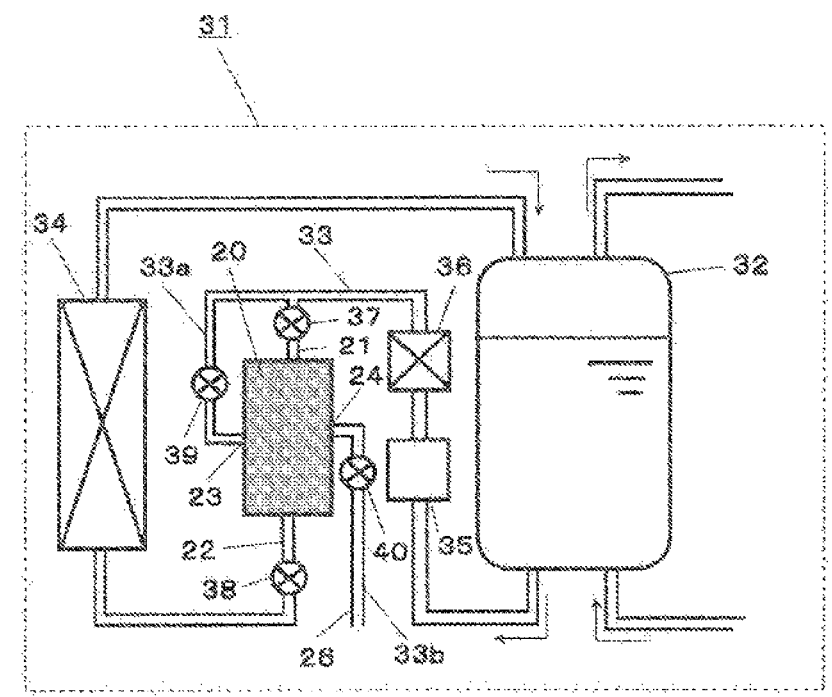
| 20 | Water softening device (Water treatment device) |
| 31 | Hot water supply device |

[Fig. 9]
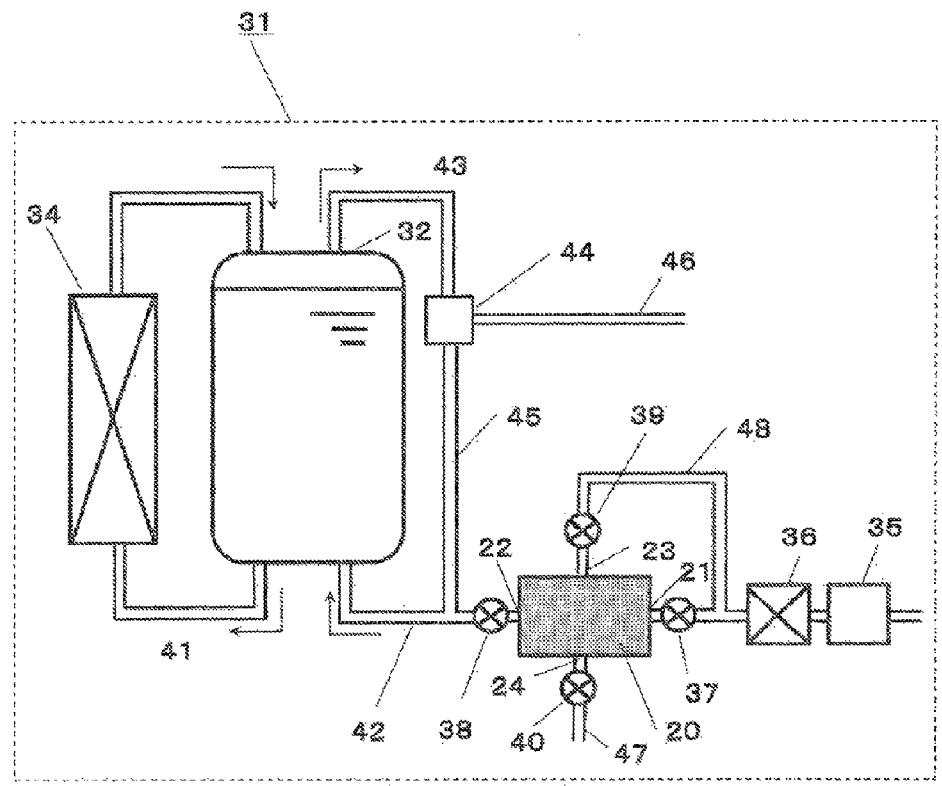

[Fig. 10]
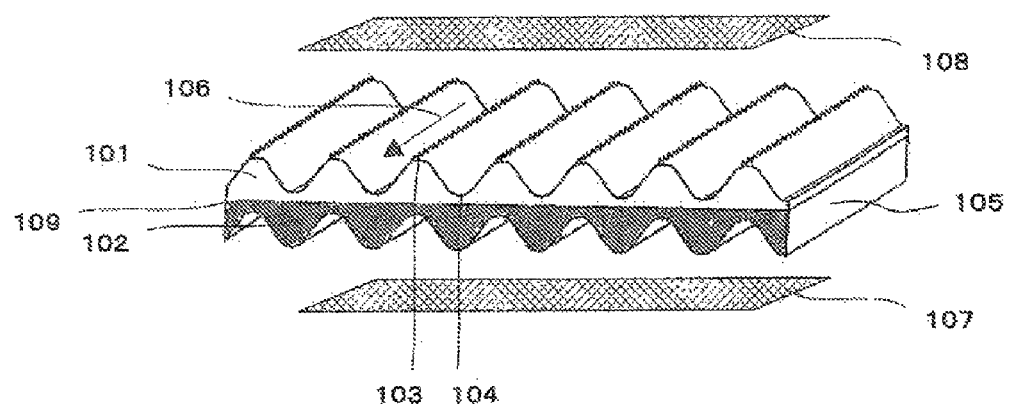

ION EXCHANGER, WATER TREATMENT DEVICE PROVIDED WITH SAME, AND HOT WATER SUPPLY DEVICE

TECHNICAL FIELD

The present invention relates to an ion exchanger which separates and removes impurities included in liquid, and a water treatment device using the ion exchanger.

BACKGROUND TECHNIQUE

Conventionally, as the ion exchanger of this kind, there is one using a sintered body formed by sintering ionic exchange resin and thermoplastic resin (see patent document 1 for example).

The ion exchanger disclosed in patent document 1 is formed by sintering and coupling such that ionic exchange resin particles exists in porous matrix of thermoplastic resin. Therefore, as the amount of ionic exchange resin charged into the sintered body is greater, the ion exchange capacity becomes greater.

As a producing method of ion exchanger formed by sintering and coupling, there is known a method of coupling functional group by graft polymerization (see patent document 2 for example).

In the producing method of ion exchanger disclosed in patent document 2, cross linked body layer made of graft polymer chain is formed on sintered body surface of polyolefin resin particles, and functional group such as ion exchange group and chelate group is coupled to graft polymer chain, thereby suppressing elution of impurities.

As a water treatment device which removes hardness component in liquid to obtain soft water by ion exchanger, and automatically carries out regeneration processing of the ion exchanger, there is known such a method that textured film having textured structure in which peak and valley are alternately placed on a surface is used as positive ion exchange layer and negative ion exchange layer, and ion exchanger in which the textured films are laminated is used to remove hardness component in water (see patent document 3 for example).

FIG. 10 is a schematic diagram showing outline structure of the textured film and electrochemical cell disclosed in patent document 3.

As shown in FIG. 10, the textured film 105 disclosed in patent document 3 includes a positive ion exchange layer 101 and an negative ion exchange layer 102 which is adjacent to the positive ion exchange layer 101, and a surface of the textured film 105 has textured structure in which peaks 103 and valleys 104 are alternately placed at distances from one another. Since a surface area of the film is increased by the peaks 103 and the valleys 104 formed on the textured film 105, when water including hardness component is supplied to the textured film 105, absorption speed of hardness component can be increased.

Further, patent document 3 discloses electrochemical cell in which an electrode 107 and an electrode 108 are placed on both sides of the textured film 105. According to the electrochemical cell disclosed in patent document 3, if voltage is applied to both the electrodes 107 and 108 in the presence of water, water is disassociated at an interface 109 between the positive ion exchange layer 101 and the negative ion exchange layer 102, and H+ and OH− are produced. The H+ and OH− are positive ion and negative ion absorbed by the positive ion exchange layer 101 and the negative ion exchange layer 102 are replaced, the positive ion exchange layer 101 and the negative ion exchange layer 102 can be regenerated, and the ion exchanger can repeatedly be used.

PRIOR ART DOCUMENT

Patent Document

[PATENT DOCUMENT 1] Japanese Patent Application Laid-open No. H7-204429
[PATENT DOCUMENT 2] Japanese Patent Application Laid-open No. 2009-235417
[PATENT DOCUMENT 3] Japanese Translation of PCT International Application, Publication No. 2008-507406

DISCLOSURE OF THE INVENTION

Problem to be Solved by the Invention

However, according to the configurations of patent document 1 and patent document 2, when hardness component of water is absorbed and removed, if hardness component absorbed by ionic exchange resin is brought into a saturated state, hardness component cannot be removed. Therefore, it is necessary to regenerate ionic exchange resin using medical agent such as salt and acid.

According to the configuration of patent document 3, voltage is applied to ion exchanger to which hardness component adheres by the electrodes placed on both sides of the ion exchanger, thereby regenerating the ion exchanger. However, if ion absorption and regeneration of ion exchanger are repeatedly carried out with respect to a large amount of water, regenerating ability of ion exchanger, i.e., a desorption amount of ion absorbed by the ion exchanger is gradually reduced, and there is a problem that ion absorbing ability exchanger, i.e., ion absorption amount of ion exchanger is reduced.

The present invention has been accomplished to solve the above problem, and it is an object of the invention to provide an ion exchanger capable of suppress deterioration of ion absorbing ability caused by deterioration of regenerating ability of the ion exchanger, and capable of efficiently carrying out ion absorption and regeneration processing, and to provide a water treatment device provided with the ion exchanger, and a hot water supply device provided with the water treatment device.

Means for Solving the Problem

To solve the above problem, the present invention provides an ion exchanger comprising: a porous positive ion exchanger having binder particles and particles of positive ionic exchange resin and formed into a sheet shape; and a porous negative ion exchanger having binder particles and particles of negative ionic exchange resin and formed into a sheet shape, wherein the positive ion exchanger and the negative ion exchanger are bonded to each other to form an interface, and capacity of the negative ion exchanger is greater than that of the positive ion exchanger.

According to this, porous ion exchanger is formed to enhance the ion absorbing ability, and capacity of negative ion exchanger is made greater than that of positive ion exchanger. According to this, it is possible to secure regenerating ability of ion exchanger with respect to ion absorbing ability and therefore, it is possible to suppress deterioration of regenerating ability of the ion exchanger.

Effect of the Invention

According to the present invention, it is possible to provide an ion exchanger capable of efficiently carrying out the ion absorption and regeneration processing.

BRIEF DESCRIPTION OF THE DRAWINGS

FIG. 1 is a sectional view showing outline configuration of an ion exchanger according to a first embodiment of the present invention;

FIG. 2 is an enlarged diagram of essential portions of the ion exchanger;

FIG. 3 is a graph showing a regeneration ratio and an ion absorption amount which are varied by ion exchange capacity ratio in the ion exchanger;

FIG. 4 is a sectional view showing outline configuration of ion exchanger according to a second embodiment of the invention;

FIG. 5(a) is a sectional view showing outline configuration of ion exchanger according to a third embodiment of the invention, and FIG. 5(b) is a plan view showing outline configuration of a two-layer composition of the ion exchanger;

FIG. 6 is a sectional view showing an internal structure of a water treatment device according to a fourth embodiment of the invention;

FIG. 7(a) is a plan view of a water treatment device according to a fifth embodiment of the invention, and FIG. 7(b) is a sectional view showing an internal structure of the water treatment device;

FIG. 8 is a diagram showing outline configuration of a hot water supply device according to a sixth embodiment of the invention;

FIG. 9 is a diagram showing outline configuration of a hot water supply device according to a seventh embodiment of the invention; and FIG. 10 is a schematic diagram showing outline configurations of a conventional ion exchanger and a conventional water treatment device.

MODE FOR CARRYING OUT THE INVENTION

A first aspect of the present invention provides an ion exchanger comprising: a porous positive ion exchanger having binder particles and particles of positive ionic exchange resin and formed into a sheet shape; and a porous negative ion exchanger having binder particles and particles of negative ionic exchange resin and formed into a sheet shape, wherein the positive ion exchanger and the negative ion exchanger are bonded to each other to form an interface, and capacity of the negative ion exchanger is greater than that of the positive ion exchanger.

According to this, the porous positive ion exchanger can absorb hardness component to remove the hardness component, and the porous negative ion exchanger having different polarity can also absorb and remove negative ion. Further, since the ion exchanger is composed of fine particles of ionic exchange resin and has a porous shape, a surface area of the ion exchanger is large. Therefore, it is possible to increase absorption speed and the absorbing ability of hardness component also with respect to liquid of large flow rate. Further, since the ion exchanger includes negative ion exchanger having capacity of the negative ion exchanger greater than that of the positive ion exchanger, it is possible to secure regenerating ability of ion exchanger with respect to ion absorbing ability, to suppress deterioration of the regenerating ability of ion exchanger, and to efficiently carryout absorption of ion and regeneration of ion exchanger.

According to a second aspect, in the first aspect, the positive ion exchanger includes a first positive ion exchanger bonded to the negative ion exchanger to form the interface, and a second positive ion exchanger laminated on a surface of the first positive ion exchanger opposite from the interface, the negative ion exchanger includes a first negative ion exchanger bonded to the positive ion exchanger to form the interface, and a second negative ion exchanger laminated on a surface of the first negative ion exchanger opposite from the interface, capacity of the second positive ion exchanger is greater than that of the first positive ion exchanger, and capacity of the second negative ion exchanger is greater than that of the first negative ion exchanger.

According to this, a portion in which the interface between the positive ion exchanger and the negative ion exchanger required mainly for enhancing the regenerating ability of ion exchanger is formed and a portion required for enhancing the ion absorbing ability are separately formed. Hence, it is possible to thinly configure the two-layer composition of the first positive ion exchanger and the first negative ion exchanger having the interface which is required for enhancing regenerating ability of the ion exchanger, and it is possible to increase the strength. Further, capacities of the second positive ion exchanger and the second negative ion exchanger are made relatively greater than capacities of the first positive ion exchanger and the first negative ion exchanger, and the ion absorbing ability can be enhanced.

According to a third aspect of the invention, in the second aspect, particle diameter of the positive ionic exchange resin included in the first positive ion exchanger is smaller than that of the positive ionic exchange resin included in the second positive ion exchanger, and particle diameter of the negative ionic exchange resin included in the first negative ion exchanger is smaller than that of the negative ionic exchange resin included in the second negative ion exchanger.

According to this, a particles diameter of the ionic exchange resins included in the second positive ion exchanger and the second negative ion exchanger which mainly contribute to enhancement of ion absorbing ability becomes relatively greater a particles diameter of ionic exchange resins included in the first positive ion exchanger and the first negative ion exchanger. Therefore, porous spaces become large. Hence, water flowing resistance in the second positive ion exchanger and the second negative ion exchanger can be reduced. As a result, water is supplied to the entire ion exchanger, water and particles of ionic exchange resin easily come into contact with each other, and efficiency of ion absorption, i.e., an ion absorption amount of ion exchanger per unit time is enhanced. A particles diameter of ionic exchange resins included in the first positive ion exchanger and the first negative ion exchanger which mainly contribute to enhancement of the regenerating ability of ion exchanger becomes relatively smaller than a particles diameter of ionic exchange resins included in the second positive ion exchanger and the second negative ion exchanger. Hence, a contact area between the first positive ion exchanger and the first negative ion exchanger at the interface formed between the first positive ion exchanger and the first negative ion exchanger is increased, and the regenerating ability of ion exchanger can be enhanced.

According to a fourth aspect of the invention, in the second or third aspect, a mixing ratio of the binder particles included in the first positive ion exchanger is equal to or greater than that of the binder particles included in the second positive ion exchanger, and a mixing ratio of the binder particles included in the first negative ion exchanger is equal to or greater than that of the binder particles included in the second negative ion exchanger.

According to this, a content of binder particles included in the second positive ion exchanger and the second negative ion exchanger which mainly contribute to the enhancement of the ion absorbing ability becomes relatively smaller than a content of binder particles included in the first positive ion exchanger and the first negative ion exchanger, and the capacity of the ionic exchange resin can be enhanced. Hence, the ion absorbing ability is increased. An amount of binder particles included in the first positive ion exchanger and the first negative ion exchanger which mainly contribute to enhancement of regenerating ability of ion exchanger becomes relatively greater than a content of binder particles included in the second positive ion exchanger and the second negative ion exchanger, and it is possible to strongly configure the interface formed between the first positive ion exchanger and the first negative ion exchanger, and to enhance the regeneration efficiency at the time of regeneration processing of the ion exchanger.

According to a fifth aspect of the invention, in any one of the second to fourth aspects, capacity of the second negative ion exchanger is greater than that of the second positive ion exchanger.

According to this, capacity of the second negative ion exchanger can be made greater than capacity of the second positive ion exchanger, and it is possible to secure regenerating ability of ion exchanger with respect to the ion absorbing ability. Hence, it is possible to suppress the deterioration of regenerating ability of ion exchanger, and to efficiently carry out the absorption of ion and regeneration of the ion exchanger.

According to a sixth aspect of the invention, in the first aspect, the positive ion exchanger and the negative ion exchanger include through holes.

According to this, water flowing resistance when water passes through the ion exchanger can be made small. Therefore, water softening processing of water of large flow rate can be carried out. Further, water invades over the entire ion exchanger through the through hole, water and particles of ionic exchange resin easily come into contact with each other, and the ion absorbing ability of ion exchanger can effectively be exerted.

According to a seventh aspect of the invention, in any one of the second to fifth aspects, the first positive ion exchanger and the first negative ion exchanger include through holes.

According to this, in the two-layer composition in which the interface is formed, and which is obtained by laminating and adhering the first positive ion exchanger and the first negative ion exchanger which have large pressure loss when water passes, the water flowing resistance can be reduced. Therefore, the water softening processing of water of large flow rate can be carried out. Water invades over the entire ion exchanger through the through hole, water and particles of ionic exchange resin easily come into contact with each other, and the ion absorbing ability of ion exchanger can effectively be exerted.

An eighth aspect of the invention provides a water treatment device using the ion exchanger according to any one of the first to seventh aspects, including at least one more ion exchanger, in which the plurality of ion exchangers are placed between a pair of electrodes, the water treatment device further including: a casing covering the electrodes and all of the ion exchangers; and a first water inlet, a second water inlet, a first water outlet and a second water outlet formed in the casing, wherein the plurality of ion exchangers are placed at a predetermined distance from each other, the first water inlet and the first water outlet are provided such that water flows in a direction perpendicular to a sheet surface of the ion exchanger, and the second water inlet and the second water outlet are provided such that water flows in a direction parallel to the sheet surface of the ion exchanger.

According to this, water is disassociate at the interface of the ion exchanger by applying voltage between the electrodes, and the regeneration processing of ion exchanger can be carried out by the disassociated water. Hence, it is possible to provide an easy-to-use water treatment device. Further, since water can flow through the ion exchanger from a plurality of directions, water flowing directions can appropriately be selected (separately be used) at the time of absorption of ion (at the time of water softening processing) and at the time of regeneration of ion exchanger, and it is possible to reduce an amount of water used for the regeneration processing of ion exchanger and discharged.

A ninth aspect of the invention provides a water treatment device using the ion exchanger according to any one of the first to seventh aspects, including at least one more ion exchanger, in which the plurality of ion exchangers are placed between a pair of electrodes, the water treatment device further including: a casing covering the electrodes and all of the ion exchangers; and a first water inlet, a second water inlet, a first water outlet and a second water outlet formed in the casing, wherein the plurality of ion exchangers are placed at a predetermined distance from each other, the first water inlet and the first water outlet are provided such that water flows in a direction parallel to the sheet surface of the ion exchanger, and the second water inlet and the second water outlet are provided such that water flows in the direction parallel to the sheet surface of the ion exchanger.

According to this, water is disassociate at the interface of the ion exchanger by applying voltage between the electrodes, and the regeneration processing of ion exchanger can be carried out by the disassociated water. Hence, it is possible to provide an easy-to-use water treatment device. Further, by flowing water in a direction parallel to the surface of ion exchanger which is formed into a sheet shape, it is possible to reduce the water flowing resistance. Hence, water softening processing of water of large flow rate can be carried out.

A tenth aspect of the invention provides a hot water supply device including the water treatment device according to the eighth or ninth aspect.

According to this, it is possible to absorb positive ion included in water supplied to the hot water supply device, especially hardness component such as Ca and Mg, and to produce softened water. Hence, it is possible to prevent scale component from adhering to a pipe in the hot water supply device.

Embodiments of the present invention will be described with reference to the drawings. The invention is not limited to the embodiments.

(First Embodiment)

Ion exchanger according to a first embodiment is configured in such a manner that porous positive ion exchanger which is formed into a sheet shape and a porous negative ion exchanger which is formed into a sheet shape are laminated on and adhered to each other. The porous positive ion exchanger is obtained in such a manner that binder particles and fine particles of positive ionic exchange resin are mixed with each other into paste form first mixture, and the first mixture is formed into a sheet shape. The porous negative ion exchanger is obtained in such a manner that binder particles and fine particles of negative ionic exchange resin are mixed with each other into paste form second mixture, and the second mixture is formed into a sheet shape.

Ion exchanger according to the first embodiment will be described in detail with reference to FIGS. 1 and 2.

FIG. 1 is a sectional view showing outline configuration of the ion exchanger according to the first embodiment of the present invention, and FIG. 2 is an enlarged diagram of essential portions showing a state of particles of the ion exchanger. As shown in FIGS. 1 and 2, the ion exchanger 1 includes positive ion exchanger 2 and negative ion exchanger 3. The ion exchanger 1 is provided with a plurality of through holes 18.

The positive ion exchanger 2 includes positive ionic exchange resin particles 4 having a roll to adhere positive ion, and first binder particles 5 having a roll to connect the positive ionic exchange resin particles 4 to each other. The negative ion exchanger 3 which absorbs negative ion includes negative ionic exchange resin particles 6, and second binder particles 7 having a roll to connect the negative ionic exchange resin particles 6 to each other.

Here, capacity of the negative ion exchanger 3 is made greater than that of the positive ion exchanger 2. The term "capacity" here means ion exchange capacities of the positive ion exchanger 2 and the negative ion exchanger 3. That is, ion exchange capacity of the negative ionic exchange resin included in the ion exchanger 1 is greater than the ion exchange capacity of the positive ionic exchange resin. According to this, the positive ion exchanger 2 and the negative ion exchanger 3 which are formed into sheet shape are configured such that film thickness of the positive ion exchanger 2 is smaller than film thickness of the negative ion exchanger 3.

As the binder particles, it is possible to use polyethylene, polypropylene, ethylene-propylene copolymer, ethylene-vinyl acetate copolymer, polyolefin resin such as ethylene-acrylic acid copolymer, polyvinylidene fluoride and PTFE for example. The same kinds or different kinds of materials may be used as the first binder particles 5 and the second binder particles 7.

Strongly acidic positive ionic exchange resin having exchange group-SO3H is suitable as the positive ionic exchange resin. Strongly basic ionic exchange resin having exchange group-NR3OH is suitable of the negative ionic exchange resin. When voltage is applied to the ion exchanger 1 as will be described later, it is possible to use mildly acidic positive ionic exchange resin having exchange group-RCOOH and weakly basic negative ionic exchange resin having mildly acidic positive ionic exchange resin-NR2.

A mixing ratio of the first binder particles 5 in the positive ion exchanger 2 is preferably 5 wt % or more and more preferably 10 wt % or more of a total weight of the positive ion exchanger 2 from the standpoint that the positive ionic exchange resin particles 4 are sufficiently immobilized. The mixing ratio of binder means a weight ratio in which binder particles are occupied in a total of ionic exchange resin and binder particles included in unit area.

The mixing ratio of the first binder particles 5 in the positive ion exchanger 2 is preferably 40 wt % or less and more preferably 30 wt % or less of the total weight of the positive ion exchanger 2 from the standpoint that ion exchange performance of the positive ion exchanger 2 is secured and the ion exchanger 1 is made compact. If the mixing ratio of the first binder particles 5 becomes 40 wt % or more, a ratio that the first binder particles 5 cover surfaces of the positive ionic exchange resin particles 4 is increased, and the ion exchange performance is deteriorated. From the same standpoint, a mixing ratio of the binder particles 7 in the negative ion exchanger 3 is 5 to 40 wt % and more preferably 10 to 30 wt % of a total weight of the negative ion exchanger 3.

Next, a producing method of ion exchanger 1 according to the first embodiment will be described.

The positive ion exchanger 2 and the negative ion exchanger 3 are produced in such a manner that the ionic exchange resin and powder of the binder particles are mixed with each other into paste form, and this is formed into a sheet shape. Since the negative ion exchanger 3 is produced in the same manner as the positive ion exchanger 2, detailed explanation thereof will be omitted.

In the producing method of the positive ion exchanger 2, the positive ionic exchange resin particles 4, the first binder particles 5 and water or solvent are mixed with each other, and first mixture which is uniformly mixed by a kneading machine is obtained. At this time, the first binder particles 5 are formed into extremely thin film form or string form, and the first binder particles 5 are uniformly dispersed between the positive ionic exchange resin particles 4. Next, the first mixture is formed into a sheet shape having constant thickness by a roll in which a predetermined gap is controlled, and the positive ion exchanger 2 is obtained. Similarly, second mixture is obtained from the negative ionic exchange resin particles 6 and the second binder particles 7, and the negative ion exchanger 3 is molded.

After the positive ion exchanger 2 and the negative ion exchanger 3 are superposed on each other, the positive ion exchanger 2 and the negative ion exchanger 3 are adhered to each other while applying no load or slight load thereto. According to this, the ion exchanger 1 is obtained. By the above-described procedure, particles of the ionic exchange resin are fixed in matrixes of binder particles, and the porous ion exchanger 1 can be molded.

Since the ion exchangers having different polarities are bonded to each other through the ion exchanger 1 which is molded in this manner, it is possible to absorb not only hardness component (positive ion such as Ca ion and Mg ion) but also absorb negative ion (Cl ion, vitriolic ion, nitrate ion).

According to the ion exchanger 1 of the first embodiment, by applying voltage to the ion exchanger 1 in the presence of water, water is disassociated at the interface (bonded surface) 10 between the positive ion exchanger 2 and the negative ion exchanger 3, and hydrogen ion and hydroxide ion are produced as will be described later. Positive ion absorbed by the positive ionic exchange resin particles 4 and negative ion absorbed by the negative ionic exchange resin particles 6 are respectively replaced by the produced hydrogen ion and hydroxide ion, and they are desorbed from the ion exchanger 1. By such regeneration processing, it is possible to regenerate the ion exchanger 1.

When the ion exchanger 1 is used for water softening processing to remove hardness component in water, it is necessary that hardness component such as Ca ion is efficiently replaced by hydrogen ion and is desorbed from the ion exchanger 1 at the time of regeneration processing. For this purpose, it is necessary that negative ion such as Cl which forms counterion together with positive ion which is hardness component such as Ca exists, and that the interface 10 at which water is disassociated exists. As concentration of the counterion is higher, a ratio (regeneration ratio) of ion desorbing rom the ion exchanger 1 in the absorbed ion becomes higher.

Regeneration ratios were measured while changing a ratio (ion exchange capacity ratio) between capacity C of the positive ion exchanger 2 and the capacity A of the negative ion exchanger 3 to 5:1, 1:1, 1:2 and 1:3, the regeneration ratios were about 9%, 47%, 70% and 79% as shown in a curved line (a) in FIG. 3. From this measurement result, it could be confirmed that as capacity of the negative ion exchanger 3 which absorbed negative ion that was counterion was increased, the regeneration ratio was enhanced. This means that when ion absorption processing (water softening processing) is repeatedly carried out using the ion exchanger 1, in order to maintain the ion absorption amount, it is necessary to enhance the regeneration ratio. Hence, it is preferable that the ion exchanger 1 is configured such that the ion exchange capacity ratio becomes greater than 1:1, i.e., capacity of the negative ion exchanger 3 becomes greater than capacity of the positive ion exchanger 2.

In the above-described measurement, a water treatment device formed by laminating 13 ion exchangers 1 having film capacity of 150 cm$^3$ and film thickness T of 2.3 mm between a pair of electrodes having a distance L between the electrodes of 35 mm and accommodated in a casing was used. Hard water having hardness of 200 ppm was made to flow through the water treatment device, and the hardness component was saturated and absorbed by the ion exchangers 1. Thereafter, DC of 200 V was applied to the electrodes while flowing a constant amount of water to carry out the regeneration processing, and the regeneration ratio was obtained from an amount of saturated and absorbed hardness component and from an amount of hardness component desorbed from the ion exchangers 1 at the time of regeneration processing.

If 5:1 of the ion absorbing ability (ion absorption amount) of the positive ion exchanger 2 is defined as 100, as a capacity ratio of the negative ion exchanger 3 is increased, there is a tendency that the ion absorbing ability is reduced as shown by a curved line (b) in FIG. 3. This means that in the ion exchangers 1 having constant film thickness T, if a capacity ratio of the negative ion exchanger 3 is increased, a capacity ratio of the positive ion exchanger 2 is reduced.

An ion absorption amount (product of the ion absorption amount and the regeneration ratio) of thee positive ion exchanger 2 to which the regeneration ratio of the ion exchanger 1 is added shows a curved line in which the ion exchange capacity ratio has a peak between 1:1 and 1:2 as shown by a curved line (c) in FIG. 3. From the above-described standpoint, it is preferable that a capacity ratio (ion exchange capacity ratio) between the positive ion exchanger 2 and the negative ion exchanger 3 in the ion exchanger 1 is greater than 1:1 and not more than 1:2.

In order to disassociate water at the interface (bonded surface) 10 between the positive ion exchanger 2 and the negative ion exchanger 3, it is preferable that the interface 10 is formed by strongly adhering the positive ion exchanger 2 and the negative ion exchanger 3 to each other, and a contact area between the positive ionic exchange resin particles 4 and the negative ionic exchange resin particles 6 is increased. According to this, the regenerating ability of the ion exchanger 1 (ion desorption amount) is enhanced. If the interface 10 is made strong, since the water flowing resistance of the ion exchanger 1 is increased, and in order to flow water through the ion exchanger 1, it is necessary to send water under large pressure.

Hence, in the first embodiment, the ion exchanger 1 includes the through holes 18. As shown in FIG. 1, the through holes 18 penetrates a film of the sheet shape ion exchanger 1 from a surface of the positive ion exchanger 2 opposite from the interface 10 to a surface of the negative ion exchanger 3 opposite from the interface 10. That is, through holes 18a formed in the positive ion exchanger 2 and through holes 18b formed in the negative ion exchanger 3 are in communication with each other.

According to this, it is possible to reduce the water flowing resistance of the ion exchanger 1. Since water can evenly be supplied to the ion exchanger 1 through the through holes 18, contact frequency between the ionic exchange resin particles and water is increased, and the ion absorbing ability possessed by the ion exchanger 1 can be exerted at a maximum.

Diameters and the number of through holes 18 are appropriately selected based on an amount of water flowing to the ion exchanger 1. Here, as the diameters and the number of through holes 18 are greater, a contact area between the positive ionic exchange resin particles 4 and the negative ionic exchange resin particles 6 in the interface 10 is reduced, and the regenerating ability of the ion exchanger 1 is deteriorated. Hence, in order to maintain the regenerating ability of the ion exchanger 1, it is preferable that the through holes 18 are formed in a range of 20% or less and more preferably in a range of 15% or less with respect to a surface area of the ion exchanger 1.

It is preferable that the through holes 18 are provided such that the number of through holes 18 per unit area in the surface of the ion exchanger 1 which is formed into the sheet shape is substantially the same. According to this, water can evenly be supplied to the ion exchanger 1, and it is possible to enhance both absorbing ability and regenerating ability. Further, it is possible to reduce the water flowing resistance of ion exchanger 1, and it is possible to carry out water softening processing of water of large flow rate. The through holes 18 can be molded after the ion exchanger 1 is molded.

The ion exchanger 1 of the first embodiment has the porous positive ion exchanger 2 and the porous negative ion exchanger 3. Therefore, as compared with a film having a textured shape, it is possible to increase ion exchange capacity per unit volume, and absorbing speed of the positive ion and the negative ion can be increased. Hence, when the water treatment device is configured using the ion exchanger 1 of the embodiment, the device can be made compact and it is possible to efficiently process a large amount of water.

According to the ion exchanger 1 of the first embodiment, the positive ionic exchange resin particles 4 and the negative ionic exchange resin particles 6 are immobilized in a gap between the binder particles. Hence, it is possible to restrain the positive ionic exchange resin particles 4 and the negative ionic exchange resin particles 6 from falling off from the ion exchanger 1.

(Second Embodiment)

A second embodiment of the present invention will be described below. In the second embodiment, the same symbols are allocated to the same members as those of the first embodiment, and detailed explanation thereof will be omitted. FIG. 4 is a schematic diagram showing outline configuration of an ion exchanger 1 in the second embodiment.

As shown in FIG. 4, the ion exchanger 1 of the second embodiment includes a positive ion exchanger 2 having a first positive ion exchanger 12a and a second positive ion exchanger 12b, and a negative ion exchanger 3 having a first negative ion exchanger 13a and a second negative ion exchanger 13b.

The ion exchanger 1 of the second embodiment is configured in such a manner that the second positive ion exchanger 12b and the second negative ion exchanger 13b are laminated on an outer side of a two-layer composition 11 which is obtained by laminating and adhering the first positive ion exchanger 12a and the first negative ion exchanger 13a on and to each other.

The first positive ion exchanger 12a is configured in such a manner that water or solvent, first binder particles and positive ionic exchange resin particles are mixed with each other, the mixture is formed into paste form to obtain first mixture, and the first mixture is formed into a sheet shape. The first negative ion exchanger 13a is configured in such a manner that water or solvent, second binder particles and negative ionic exchange resin particles are mixed with each other, the mixture is formed into paste form to obtain second mixture, and the second mixture is formed into a sheet shape. The first positive ion exchanger 12a and the first negative ion exchanger 13a are laminated on and adhered to each other to configure the two-layer composition 11, and an interface 10 is formed between the first positive ion exchanger 12a and the first negative ion exchanger 13a.

The second positive ion exchanger 12b is configured in such a manner that water or solvent, third binder particles and positive ionic exchange resin particles are mixed with each other, the mixture is formed into paste form to obtain third mixture, and the third mixture is formed into a sheet shape. The second positive ion exchanger 12b is laminated on a surface of the interface 10 which is opposite from a surface thereof to which the first positive ion exchanger 12a and the first negative ion exchanger 13a are adhered. The second positive ion exchanger 12b may be adhered to the first positive ion exchanger 12a, and a term "lamination" also includes adhesion.

If the two-layer composition 11, the second positive ion exchanger 12b and the second negative ion exchanger 13b are adhered to one another, ion absorbing ability is enhanced, but film thickness is increased, stress is increased by deformation when the ion exchanger 1 includes water, deformation is prone to be generated and there is a tendency that strength is lowered. On the other hand, if the two-layer composition 11, the second positive ion exchanger 12b and the second negative ion exchanger 13b are merely laminated on one another, although the ion absorbing ability is lowered as compared with a case where they are adhered to one another, it is possible to prevent the strength from lowering. One of the lamination and adhesion is appropriately selected based on ion absorbing ability which is required for the ion exchanger 1.

The second positive ion exchanger 12b is configured such that capacity thereof becomes greater than that of the first positive ion exchanger 12a. That is, capacity of the positive ionic exchange resin included in the second positive ion exchanger 12b is greater than that of the positive ionic exchange resin included in the first positive ion exchanger 12a. According to this, film thickness of the second positive ion exchanger 12b which is formed into the sheet shape is greater than film thickness of the first positive ion exchanger 12a.

The second negative ion exchanger 13b is configured in such a manner that water or solvent, fourth binder particles and the negative ionic exchange resin particles are mixed with each other, the mixture is formed into paste form to obtain fourth mixture, and the fourth mixture is formed into a sheet shape. The second negative ion exchanger 13b is laminated on a surface of the interface 10 which is opposite from a surface thereof to which the first negative ion exchanger 13a and the positive ion exchanger 2 are adhered. The second negative ion exchanger 13b may be adhered to the first negative ion exchanger 13a. Capacity of the second negative ion exchanger 13b is greater than that of the first negative ion exchanger 13a. That is, capacity of negative ionic exchange resin included in the second negative ion exchanger 13b is greater than that of negative ionic exchange resin included in the first negative ion exchanger 13a. According to this, film thickness of the second negative ion exchanger 13b which is formed into the sheet shape is greater than that of the first negative ion exchanger 13a.

Here, it is preferable that capacity of the second negative ion exchanger 13b is greater than that of the second positive ion exchanger 12b. According to this, regenerating ability of the ion exchanger 1 is enhanced, and the regeneration ratio of the ion exchanger 1 is enhanced. Hence, it is possible to efficiently carry out ion absorption (water softening processing) and regeneration processing as described above.

The ion exchanger shown in the first embodiment can efficiently process a large amount of water, but capacity of the entire ion exchanger 1 is large and thickness thereof is thick. Hence, when water flows through the ion exchanger 1, the ion exchanger 1 is deformed especially in the vicinity of the interface 10 in some cases due to a difference between a swelling ratio with respect to water in the positive ionic exchange resin particles 4 and a swelling ratio with respect to water in the negative ionic exchange resin particles 6. The second embodiment is for providing a configuration capable of solving the above-described problem.

One example of the ion exchanger according to the second embodiment will be described in detail below with reference to FIG. 4. FIG. 4 is the schematic diagram showing the outline configuration of the ion exchanger 1 in the second embodiment.

As shown in FIG. 4, the ion exchanger 1 of the second embodiment includes the first positive ion exchanger 12a and the first negative ion exchanger 13a. The first positive ion exchanger 12a includes positive ionic exchange resin particles and first binder particles, and the first negative ion exchanger 13a includes negative ionic exchange resin particles and second binder particles.

Capacity of the first negative ion exchanger 13a is almost the same as that of the first positive ion exchanger 12a, i.e., film thicknesses of both of them are substantially the same. The first negative ion exchanger 13a and the first positive ion exchanger 12a are laminated on and adhered to each other, thereby configuring a two-layer composition 11. According to this, the interface 10 is formed between the first negative ion exchanger 13a and the first positive ion exchanger 12a.

The second positive ion exchanger 12b having the positive ionic exchange resin particles and the third binder particles and formed into the sheet shape is laminated on a surface of the first positive ion exchanger 12a opposite from the interface 10. The second negative ion exchanger 13b having the negative ionic exchange resin particles and the fourth binder particles and formed into the sheet shape is laminated on a surface of the first negative ion exchanger 13a opposite from the interface 10. Capacity of the second positive ion exchanger 12b is greater than that of the first positive ion exchanger 12a, and capacity of the second negative ion exchanger 13b is greater than that of the first negative ion exchanger 13a.

Next, a producing method of the ion exchanger 1 of the second embodiment will be described.

For example, the first positive ion exchanger 12a is produced from the first mixture which is obtained in such a manner that the positive ionic exchange resin particles, the first binder particles, and water or solvent are mixed with each other, and the mixture is uniformly mixed by a kneading machine. At this time, the first binder particles are formed into extremely thin film form or string form, and the first binder particles are uniformly dispersed between the positive ionic exchange resin particles. The first mixture is formed into a sheet shape by a roll having a predetermined gap while controlling thickness of the first mixture, and the first positive ion exchanger 12a is obtained.

The first negative ion exchanger 13a is produced from the second mixture which is obtained in such a manner that the positive ionic exchange resin particles, the first binder particles, and water or solvent are mixed with each other, the mixture is uniformly mixed by a kneading machine. At this time, the second binder particles are formed into extremely thin film form or string form, and the second binder particles are uniformly dispersed between the negative ionic exchange resin particles. The second mixture is formed into a sheet shape by a roll having a predetermined gap while controlling thickness of the second mixture, and the first negative ion exchanger 13a is obtained.

After the first positive ion exchanger 12a and the first negative ion exchanger 13a are superposed on each other, no load or slight load is applied thereto, they are heated, thereby adhering the first positive ion exchanger 12a and the first negative ion exchanger 13a to each other, and the two-layer composition 11 is obtained. According to this, particles of the ionic exchange resin can be immobilized in matrix of the binder particles. That is, the ion exchanger 1 can be formed into porous structure.

The second positive ion exchanger 12b can also be produced by the same method as that of the first positive ion exchanger 12a. Here, to make capacity of the second positive ion exchanger 12b greater than that of the first positive ion exchanger 12a, the second positive ion exchanger 12b is molded while increasing a gap of the roller greater than that of the first positive ion exchanger 12a.

The second negative ion exchanger 13b can also be produced by the same method as that of the first negative ion exchanger 13a. Here, to make capacity of the second negative ion exchanger 13b greater than those of the first negative ion exchanger 13a and the second positive ion exchanger 12b, the second negative ion exchanger 13b is molded while increasing a gap of the roller greater than that of the second positive ion exchanger 12b. According to this, the capacity of the second negative ion exchanger 13b becomes greater than those of the first negative ion exchanger 13a and the second positive ion exchanger 12b. Further, film thickness of the second negative ion exchanger 13b becomes greater than those of the first negative ion exchanger 13a and the second positive ion exchanger 12b. It is possible to use the same kind or different kind of first binder particles, second binder particles, the third binder particles and the fourth binder particles.

The two-layer composition 11, the second positive ion exchanger 12b and the second negative ion exchanger 13b which are molded in this manner are laminated on one another to obtain the ion exchanger 1.

Particle diameters of the positive ionic exchange resin particles and the negative ionic exchange resin particles configuring the two-layer composition 11 are equal to or smaller than those of the positive ionic exchange resin particles and the negative ionic exchange resin particles configuring the second positive ion exchanger 12b and the second negative ion exchanger 13b.

For example, particle diameters of the positive ionic exchange resin particles and the negative ionic exchange resin particles configuring the two-layer composition 11 can be set to 50 µm to 100 µm, and particle diameters of the positive ionic exchange resin particles and the negative ionic exchange resin particles configuring the second positive ion exchanger 12b and the second negative ion exchanger 13b can be set to 100 µm to 200 µm. Here, the particle diameter means an average particle diameter of a large amount of particles. When the particle diameter of the positive ionic exchange resin particles and particle diameter of the negative ionic exchange resin particles of the two-layer composition 11 are different from each other, particle diameter of the positive ionic exchange resin particles configuring the two-layer composition 11 is set equal to or smaller than that of the positive ionic exchange resin particles configuring the second positive ion exchanger 12b, and particle diameter of the negative ionic exchange resin particles configuring the two-layer composition 11 is set equal to or smaller than that of the negative ionic exchange resin particles configuring the second negative ion exchanger 13b.

If particle diameter of ionic exchange resin configuring the two-layer composition 11 is made relatively smaller than those of the ionic exchange resin particles configuring the second positive ion exchanger 12b and the second negative ion exchanger 13b, a contact ration between the positive ionic exchange resin particles and the negative ionic exchange resin particles in the interface 10 is increased. Hence, regenerating ability of the ion exchanger 1 is enhanced. Further, if the particle diameter of the two-layer composition 11 is made small, the film thickness can be thinned. Hence, deformation caused by a difference in swelling ratios is less prone to be generated, and strength is enhanced.

Particle diameters of the ionic exchange resin of the second positive ion exchanger 12b and the second negative ion exchanger 13b are made relatively greater than those of ionic exchange resin of the first positive ion exchanger 12a and the first negative ion exchanger 13a. Hence, spaces between particles of the ionic exchange resin in the second positive ion exchanger 12b and the second negative ion exchanger 13b become large. Therefore, the ion exchanger 1 is brought into porous structure, resistance when water passes is reduced, and pressure loss can be reduced.

Concerning the mixing ratio of the binder particles, mixing ratios of binder particles in the second positive ion exchanger 12b and the second negative ion exchanger 13b are made equal to or smaller than mixing ratios of the first positive ion exchanger 12a and the first negative ion exchanger 13a configuring the two-layer composition 11. Here, the mixing ratio of binder is a weight ratio occupied by the binder particles in a total of the ionic exchange resin and the binder particles included in unit volume.

In the two-layer composition 11 for example, mixing ratios of the first binder particles and the second binder particles are set to 15 to 30 wt %, and in the second positive ion exchanger 12b and the second negative ion exchanger 13b, mixing ratios of the third binder particles and the fourth binder particles are set to 5 to 15 wt %, and the ion exchanger 1 can be configured. When a mixing ratio of the first binder particles and a mixing ratio of the second binder particles are different from each other, the mixing ratio of the first binder particles is set equal to or greater than that of the third binder particles, and the mixing ratio of the second binder particles is set to equal to or greater than that of the fourth binder particles.

Mixing ratios of the first binder particles and the second binder particles are set relatively higher than those of the third binder particles and the fourth binder particles. According to this, it is possible to enhance the strength of the two-layer composition 11, and to increase a contact area between the positive ionic exchange resin and the negative ionic exchange resin in the interface 10. Therefore, it is possible to enhance the regenerating ability of the ion exchanger 1. If the mixing ratio of binders of the two-layer composition 11 is set high and particle diameter of the ionic exchange resin is made small, since the two-layer composition 11 can be made thin, water flowing resistance of the two-layer composition 11 can be reduced.

If mixing ratios of the third binder particles and the fourth binder particles are made relatively smaller than those of the first binder particles and the second binder particles, surfaces of the positive ionic exchange resin particles included in the second positive ion exchanger and surfaces of the negative ionic exchange resin particles included in the second negative ion exchanger are less prone to be covered with binder particles, and the surfaces of the ionic exchange resin particles are exposed more widely and thus, the ion absorbing ability is enhanced.

In the second embodiment, film thicknesses of the first positive ion exchanger 12a and the first negative ion exchanger 13a configuring the two-layer composition 11 are almost equal to each other. When capacity of the negative ion exchanger 3 is set greater than that of the positive ion exchanger 2, film thicknesses of the first positive ion exchanger 12a and the first negative ion exchanger 13a may be different from each other.

As described above, in the second embodiment, the two-layer composition 11, the second positive ion exchanger 12b and the second negative ion exchanger 13b laminated on the outer side of the two-layer composition 11 configure the ion exchanger 1. The ion exchanging performance is enhanced by the second positive ion exchanger 12b and the second negative ion exchanger 13b, and performance at the time of regeneration is enhanced by the two-layer composition 11. According to this, it is possible to obtain the ion exchanger 1 capable of maintaining the strength and efficiently processing a large amount of water.

(Third Embodiment)

A third embodiment of the present invention will be described below. In the third embodiment, the same symbols are allocated to the same members as those of the second embodiment, and detailed explanation thereof will be omitted.

Anion exchanger 1 according to the third embodiment has a plurality of through holes 18 in a two-layer composition 11. According to this, it is possible to further reduce pressure loss when water flows through the ion exchanger 1.

The ion exchanger 1 of the third embodiment will be described in detail with reference to FIG. 5. FIG. 5(a) is a sectional view showing outline configuration of the ion exchanger 1 of the third embodiment. FIG. 5(b) is a plan view showing outline configuration of the two-layer composition 11 of the third embodiment.

As shown in FIG. 5(a), the ion exchanger 1 of the third embodiment includes a positive ion exchanger 2 having a first positive ion exchanger 12a and a second positive ion exchanger 12b, and a negative ion exchanger 3 having a first negative ion exchanger 13a and a second negative ion exchanger 13b.

By laminating and adhering the first positive ion exchanger 12a and the first negative ion exchanger 13a on and to each other, an interface 10 is formed. In the two-layer composition 11 having the interface 10, the second positive ion exchanger 12b is laminated on a surface of the first positive ion exchanger 12a opposite from the interface 10. In the two-layer composition 11 having the interface 10, the second negative ion exchanger 13b is laminated on the first negative ion exchanger 13a opposite from the interface 10.

The two-layer composition 11 is provided with through holes 18. As shown in FIG. 5(a), the through holes 18 penetrate the two-layer composition 11 from a surface of the first positive ion exchanger 12a opposite from the interface 10 to a surface of the first negative ion exchanger 13a opposite from the interface 10. The through holes 18 are continuously formed from the surface of the first positive ion exchanger 12a opposite from the interface 10 to the surface of the first negative ion exchanger 13a opposite from the interface 10.

Diameters and the number of through holes 18 are appropriately selected based on an amount of water flowing to the ion exchanger 1. Here, as the diameters and the number of through holes 18 are greater, an area of the interface 10 is reduced, and the regenerating ability of the ion exchanger is deteriorated. Hence, in order to maintain the regenerating ability of the ion exchanger 1, it is preferable that the through holes 18 are formed in a range of 20% or less and more preferably in a range of 15% or less with respect to a surface area of the two-layer composition 11. It is preferable that the through holes 18 are provided such that the number of through holes 18 per unit area in the surface of the two-layer composition 11 which is formed into the sheet shape is substantially the same. According to this, water can evenly be supplied to the ion exchanger 1, and it is possible to enhance ion exchanging ability. It is possible to reduce water flowing resistance of the ion exchanger 1, and to soften water of large flow rate.

Next, a producing method of the third embodiment will be described.

The producing method of the ion exchanger 1 of the third embodiment has a step of forming through holes 18 in the two-layer composition 11. The through holes 18 are formed after the first positive ion exchanger 12a and the first negative ion exchanger 13a are superposed on each other, no load or slight load is applied thereto and the two-layer composition 11 is molded, or after the two-layer composition 11 is molded and dried, or after the two-layer composition 11 is molded and immerse in water before the two-layer composition 11 is assembled as a device.

By providing the through holes 18, even if water flows in a direction perpendicular to a surface of the two-layer composition 11, pressure loss at the two-layer composition 11 is not increased excessively. Water can evenly be supplied to the second positive ion exchanger 12b and the second negative ion exchanger 13b. Hence, the contact frequently between the ionic exchange resin particles and water can be increased and the ion exchanging ability can be enhanced. Further, a contact area between the first positive ion exchanger 12a and the first negative ion exchanger 13a in the interface 10 of the two-layer composition 11 can be increased, and regenerating ability and a regeneration ratio of the ion exchanger 1 can be enhanced.

(Fourth Embodiment)

A fourth embodiment of the present invention will be described below with reference to FIG. 6. In the fourth embodiment, the same symbols are allocated to the same members as those of other embodiments, and detailed explanation thereof will be omitted.

A water treatment device 20 of the fourth embodiment includes an ion exchanger 1, a casing 25 provided with water inlets (21, 23) and water outlets (22, 24), and at least a pair of electrodes (26, 27) placed in the casing 25. A plurality of porous ion exchangers 1 are placed between the pair of electrodes (26, 27).

One example of the water treatment device of the fourth embodiment will be described in detail with reference to FIG. 6.

FIG. 6 is a sectional view showing an internal structure of the water treatment device of the fourth embodiment.

As shown in FIG. 6, the water treatment device 20 includes the ion exchangers 1, the casing 25, the positive electrode 26 and the negative electrode 27. The positive electrode 26 and the negative electrode 27 are configured as a pair of electrodes. The casing 25 is provided with a water inlet (first water inlet) (processed water inlet) 21 into which water to be water softening processed in the water treatment device 20 flows, and a water outlet (first water outlet) (processed water outlet) 22 from which softening processed water flows out. The casing 25 is further provided with a water inlet (second water inlet) (regeneration water inlet) 23 into which water to be regenerated of the ion exchanger 1 in the water treatment device 20 flows, and a water outlet (second water outlet) (regeneration water outlet) 24 from which water to be regenerated flows out. The number of each of the first water inlet 21 and the first water outlet 22 need not be one, and when a sheet surface of the ion exchanger 1 is wide, a plurality of first water inlets and first water outlets may be provided. A plurality of second water inlets 23 and second water outlets 24 may be provided likewise.

The first water inlet 21 and the first water outlet 22 are respectively provided in opposed walls of the casing 25 so that water flows in a direction (lateral direction in FIG. 6) perpendicular to the sheet-shaped ion exchanger 1 placed in the casing 25.

The second water inlet 23 and the second water outlet 24 are respectively provided in the opposed walls of the casing 25 so that water flows in a direction (vertical direction in FIG. 6) parallel to the sheet-shaped ion exchanger 1 placed in the casing 25. Pipes are connected to the first water inlet 21, the first water outlet 22, the second water inlet 23 and the second water outlet 24. Hereinafter, water from which hardness component is removed by the ion exchanger 1 in the water treatment device 20 and which is to be softened is called processing water, and water used for regenerating the ion exchanger 1 is called regeneration water.

The pair of plate-shaped electrodes is provided in the casing 25, and these electrodes are composed of the positive electrode 26 and the negative electrode 27. The plurality of ion exchangers 1 and spacer members 28 are alternately laminated one another between the positive electrode 26 and the negative electrode 27.

The plate-shaped positive electrode 26 and negative electrode 27 have through holes (not shown). The through holes prevent processing water flowing vertically on the surfaces of the plate-shaped positive electrode 26 and negative electrode 27 from being hindered. Titanium is used as base material of the positive electrode 26 and the negative electrode 27. Surfaces of the positive electrode 26 and the negative electrode 27 have platinum-coated protection layers having thickness of about 0.2 µm to 0.5 µm for avoiding deterioration caused by contact with water. According to this, long term durability is ensured.

Each of the plurality of sheet-shaped ion exchangers 1 is placed such that a surface of the ion exchanger 1 is opposed to the surface of the plate-shaped negative electrode 27 and the surface of the plate-shaped positive electrode 26. Each of the ion exchangers 1 is placed such that a positive ion exchanger 2 is oriented toward the negative electrode 27 and a negative ion exchanger 3 is oriented toward the positive electrode 26.

It is preferable that the through holes 18 provided in the ion exchanger 1 are provided such that center axes of the through holes 18 of the adjacent ion exchangers 1 do not match with each other. According to this, since processing water is evenly supplied to the entire ion exchangers 1, ion absorbing ability is enhanced.

The spacer members 28 are placed between the plurality of sheet shape ion exchangers 1 for securing flow paths through which regeneration processing flows parallel to the surface of the sheet shape ion exchangers 1 between the ion exchangers 1. That is, the ion exchangers 1 and the spacer members 28 are alternately laminated on one another in the casing 25.

The spacer members 28 are not especially limited only if they do not hinder the flow of regeneration water. In the fourth embodiment, mesh sheets made of fluorine resin FTFE are used, and the mesh sheets are cut into the same area as the sheet shape ion exchanger 1 and the mesh sheets are laminated on one another.

In the casing 25, a pressure equalizing plate 29 is placed between the positive electrode 26 and the ion exchangers 1 in the vicinity of the positive electrode 26. The pressure equalizing plate 29 is made of porous polyethylene, and has water flowing resistance greater than that of the ion exchanger 1. Hence, processing water which flows into the casing 25 is dispersed by the pressure equalizing plate 29 toward a surface thereof and toward a surface of the ion exchanger 1. After the processing water reaches the surface of the pressure equalizing plate 29, the processing water flows toward the ion exchanger 1 located downstream with respect to a flowing direction of the processing water, and flows out from the first water outlet 22.

Pressure equalizing plates 30 are respectively placed between the ion exchanger 1 and the second water inlet 23 into which regeneration water flows and between the ion exchanger 1 and the second water outlet 24 from out the regeneration water flows out. The pressure equalizing plates 30 are made of porous polyethylene, and have water flowing resistance greater than that of the ion exchanger 1. Hence, regeneration water which flows into the casing 25 disperses toward surfaces of the pressure equalizing plates 30. After the regeneration water reaches the surfaces of the pressure equalizing plates 30, the regeneration water flows toward the second water outlet 24.

Next, operation of the water treatment device 20 of the fourth embodiment, especially flow of water in the water treatment device 20 will be described with reference to FIG. 6.

At the time of water softening processing (water processing), processing water flows from the first water inlet 21 toward the first water outlet 22. That is, processing water flows in a direction perpendicular to a surface of a film of the sheet shape ion exchanger 1. Here, since each of the ion exchangers 1 is porous, processing water flows through the interior of the ion exchanger 1.

Hardness component (positive ion) such as calcium component and magnesium component included in processing water comes into contact with the positive ionic exchange resin particles 4 existing in the ion exchanger 1 and is absorbed. Negative ion such as chloride ion included in processing water is absorbed by the negative ionic exchange resin particles 6. Hardness component is removed from the processing water by the water treatment device 20 in this manner and the processing water is softened, and is discharged outside of the water treatment device 20 from the first water outlet 22. In this way, the water treatment device 20 operates as a water softening device which removes hardness component from water.

On the other hand, at the time of regeneration processing of ionic exchange resin, regeneration water flows from the second water inlet 23 toward the second water outlet 24. That is, regeneration water flows parallel to the surface of the film of the sheet shape ion exchanger 1. At this time, voltage is applied between the positive electrode 26 and the negative electrode 27 such that the positive electrode 26 becomes plus and the negative electrode 27 becomes minus.

According to this, a potential difference is generated in the ion exchangers 1, and water is disassociated at the interface 10 which is formed by the positive ion exchanger 2 and the negative ion exchanger 3 of the ion exchanger 1. According to this, hydrogen ion is generated on a surface of the negative electrode 27, i.e., on the side of the positive ion exchanger 2, and hydroxide ion is generated on a surface of the positive electrode 26, i.e., on the side of the negative ion exchanger 3.

Hardness component (positive ion) such as calcium ion and magnesium ion absorbed into the positive ion exchanger 2 exchanges ion between the hardness component and the generated hydrogen ion, and the hardness component is desorbed, and positive ionic exchange resin particles in the positive ion exchanger 2 are regenerated. Negative ion such a chloride ion absorbed into the negative ion exchanger 3 exchanges ion between the negative ion and the generated hydroxide ion, the negative ion is desorbed, and negative ionic exchange resin particles in the negative ion exchanger 3 are regenerated.

Voltage applied between the positive electrode 26 and the negative electrode 27 is direct voltage and in the fourth embodiment, voltage of 100 V to 300 V is applied. Applied voltage can appropriately be set in accordance with the number of ion exchangers 1 placed in the casing 25 and hardness of processing water.

Switching operation between water softening processing (water processing) and regeneration processing is carried out by valves (not shown) provided upstream of the first water inlet 21 and downstream of the first water outlet 22 with respect to flow of processing water, and valves (not shown) provided upstream of the second water inlet 23 and downstream of the second water outlet 24 with respect to flow of regeneration water.

According to the water treatment device 20 of the fourth embodiment, by flowing processing water in the direction perpendicular to the surface of the ion exchanger 1 in this manner, a contact ratio between the positive ionic exchange resin particles 4 forming the ion exchanger 1 and hardness component included in processing water is increased. According to this, the ion absorbing ability is increased and absorption efficiency of water softening processing of processing water is enhanced. By flowing processing water in the direction perpendicular to the surface of the ion exchanger 1, a contact ratio between the negative ionic exchange resin particles and negative ion such as chloride ion included in processing water is increased. According to this, ion absorbing ability of not only positive ion but also negative ion is increased, and ion absorption efficiency is enhanced.

On the other hand, since regeneration water flows parallel to the surface of the ion exchanger 1, hardness component (positive ion) desorbed from the positive ionic exchange resin particles flows parallel along the surface of the ion exchanger 1 together with regeneration water, and is discharged from the water treatment device 20. Hence, desorbed hardness component is not kept absorbed by the positive ionic exchange resin particles. According to this, it is possible to restrain ion desorbed at the time of regeneration processing of ionic exchange resin from being again absorbed by the particles of the ionic exchange resin, and it is possible to enhance regenerating ability and regeneration ratio of the ion exchanger 1.

Since regeneration water flows parallel to the surface of the ion exchanger 1, negative ion such as chloride ion desorbed from the negative ionic exchange resin particles 6 flows parallel along the surface of the ion exchanger 1 together with regeneration water, and is discharged from the water treatment device 20. Hence, negative ion such as desorbed chloride ion is not kept absorbed by the negative ionic exchange resin particles 6. According to this, ion desorbed at the time of regeneration processing of ionic exchange resin can be restrain from being again absorbed by particles of ionic exchange resin, and it is possible to enhance regenerating ability and regeneration ratio of the ion exchanger 1.

According to the water treatment device 20 of the fourth embodiment, since the pressure equalizing plate 29 is provided, the pressure equalizing plate 29 is applied at the time of water softening processing (water processing), and processing water is supplied to the entire surfaces of the ion exchangers 1. Hence, the contact ratio between the positive ionic exchange resin particles in the ion exchangers 1 and positive ion which is hardness component is increased, and hardness component existing in the processing water can be absorbed more. By providing the pressure equalizing plate 29, a contact probability between negative ion and the negative ionic exchange resin particles 6 in the ion exchanger 1 is increased, and the negative ion exchanger 3 can further absorb hardness component existing in the processing water.

(Fifth Embodiment)

A fifth embodiment of the present invention will be described below. One example of the water treatment device according to the fifth embodiment will be described in detail with reference to FIG. 7.

FIG. 7 (*a*) is a plan view of a water treatment device 20 according to the fifth embodiment of the invention as viewed from a first water outlet 22 of processing water, and FIG. 7 (*b*) is a sectional view taken along line A-A in FIG. 7 (*a*). In the fifth embodiment, the same symbols are allocated to the same members as those of the other embodiments, and detailed explanation thereof will be omitted.

In the fifth embodiment, both processing water and regeneration water flow in a direction parallel to surfaces of sheet shape ion exchangers 1.

In the fifth embodiment, a surface of each of the ion exchangers 1 is formed into a rectangular shape having long sides and short sides. Processing water flows in a direction of the long side of the ion exchanger 1, and regeneration water flows in a direction of the short side of the ion exchanger 1. According to this, since the processing water is in contact with the ion exchanger 1 for longer time than the regeneration water, absorbing ability of ion included in processing water is increased.

The regeneration water flows in the direction of the short side of the rectangular of the ion exchanger 1. According to this, it is possible to restrain ion desorbed at the time of regeneration processing of ionic exchange resin from being again absorbed by particles of ionic exchange resin, and it is possible to enhance regenerating ability and regeneration ratio of the ion exchanger 1.

(Sixth Embodiment)

A sixth embodiment of the present invention will be described below with reference to FIG. 8. In the sixth embodiment, the same symbols are allocated to the same members as those of other embodiments, and detailed explanation thereof will be omitted.

A hot water supply device according to the sixth embodiment of the invention includes the water treatment device of the fourth or fifth embodiment.

The hot water supply device of the sixth embodiment will be described in detail with reference to FIG. 8. FIG. 8 is a schematic diagram showing outline configuration of the hot water supply device according to the sixth embodiment.

As shown in FIG. 8, the hot water supply device 31 of the sixth embodiment includes a water treatment device 20 and a hot water tank 32. A water flow pipe 33 is connected to a lower portion of the hot water tank 32. Water which flows out from the hot water tank 32 flows into water heating means 34 through a filter 35, an activated carbon 36 and the water treatment device 20, the water is heated by the water heating means 34 and becomes hot water, and the hot water flows into the hot water tank 32 from its upper portion. An upstream end of the water flow pipe 33 is connected to a lower end of the water tank 32, and a downstream end of the water flow pipe 33 is connected to an upper portion of the hot water tank 32.

A pipe through which water is supplied to the hot water tank 32 is connected to a lower portion of the hot water tank 32, and a pipe through which high temperature water stored in the hot water tank 32 is supplied to outside (e.g., family bath) is connected to an upper portion of the hot water tank 32.

As the water heating means 34, it is possible to use a heat pump device having a refrigeration cycle and a combustor such as a burner. According to this, low temperature water stored in a lower portion of the hot water tank 32 can be heated by the water heating means 34 and becomes high temperature hot water, and the hot water can be supplied to the upper portion of the hot water tank 32.

The water treatment device 20 is provided upstream of the water heating means 34 of the water flow pipe 33. More specifically, the water flow pipe 33 is connected to a first water inlet 21 and a first water outlet 22 of the water treatment device 20.

A branch pipe 33a branched from a halfway portion of the water flow pipe 33 is connected to a second water inlet 23 of the water treatment device 20, and a drain pipe 33b is connected to the second water outlet 24 of the water treatment device 20. According to this, water including hardness component produced at the time of regeneration processing of ionic exchange resin carried out by the water treatment device 20 can be discharged from the drain pipe 33b to outside of the hot water supply device 31.

The filter 35 and the activated carbon 36 are placed in the water flow pipe 33 at location upstream of the water treatment device 20 in this order in the flowing direction of water. Suspended substance and free chlorine in water are removed by the filter 35 and the activated carbon 36.

Valves 37, 38, 39 and 40 are respectively provided between a location where the water flow pipe 33 is branched from the branch pipe 33a and the first water inlet 21, between the first water outlet 22 and the water heating means 34, and in the branch pipe 33a and the drain pipe 33b. The valves 37 to 40 may be controlled such that they automatically open and close, or a user of the hot water supply device 31 can freely open and close the valves.

Next, operation of the hot water supply device 31 of the sixth embodiment will be described. In the following description, water which is not softened shall not be stored in the hot water tank 32.

In heating operation to heat water stored in the hot water tank 32 by the water heating means 34, water softening processing is carried out by the water treatment device 20. More specifically, by opening the valves 37 and 38, water in the hot water tank 32 is guided into the water treatment device 20 through the water flow pipe 33. At this time, the valves 39 and 40 are kept closed. Water is supplied from the hot water tank 32 to the water treatment device 20 by a water delivery device such as a pump (not shown).

At the time of water softening processing, direct voltage is applied to the electrode placed in the casing 25, plus voltage is applied to the negative electrode 27 on the side of the positive ion exchanger 2, and minus voltage is applied to the positive electrode 26 on the side of the negative ion exchanger 3.

As a result, hardness component such as calcium ion in water flowing into the water treatment device 20 is electrophoresed to the positive ion exchanger 2, and negative ion such as carbonate ion is electrophoresed to the negative ion exchanger 3. The calcium ion exchanges ion with respect to the hydrogen ion of —$SO_3H$ of strongly acidic ion exchange group of the positive ion exchanger 2, and the carbonate ion exchanges ion with respect to hydroxide ion of —$NR_3OH$ of strongly basic ion exchange group of the negative ion exchanger 3.

In the water treatment device 20, hardness component in processing water is absorbed by the ion exchanger 1, hardness component in processing water is removed, and the processing water is softened in this manner. The softened processing water flows out from the first water outlet 22 of the water treatment device 20, and flows into the water heating means 34 through the water flow pipe 33. Hardness component is removed, by the water treatment device 20, from processing water heated by the water heating means 34. Therefore, it is possible to prevent scale such as calcium carbonate and magnesium sulfate from adhering to an inner surface of the water flow pipe 33.

Processing water is heated by the water heating means 34 and becomes hot water, and the hot water flows through the water flow pipe 33, and flows into the hot water tank from the upper portion of the hot water tank 32. When a user uses the hot water at a hot water supply terminal (not shown), the hot water in the upper portion of the hot water tank 32 is supplied to the hot water supply terminal.

In the above description, a case where direct voltage is applied between the positive electrode 26 and the negative electrode 27 and water is softened is described, but if capacity of the ion exchanger 1 is increased, it is possible to remove hardness component even if voltage is not applied.

Next, regeneration processing carried out by the water treatment device 20 when the heating operation of the hot water supply device 31 is stopped will be described.

When the heating operation is stopped and the regeneration processing is carried out, the valves 37 and 38 are closed and the valves 39 and 40 are opened. A constant amount of water flows from the lower portion of the hot water tank 32 into the water treatment device 20 through the second water inlet 23.

In the water treatment device 20, direct voltage opposite from that at the time of the water-softening operation is applied to the positive electrode 26 and the negative electrode 27. That is, plus voltage is applied to the positive electrode 26 on the side of the negative ion exchanger 3, and minus voltage is applied to the negative electrode 27 on the side of the positive ion exchanger 2.

If voltage is applied to both sides of the ion exchanger 1, water is disassociated and hydrogen ion and hydroxide ion are generated at some point in time in the interface 10 (see FIG. 1) of the positive ion exchanger 2 and the negative ion exchanger 3. Disassociation voltage of water is theoretically 0.828 V.

In the positive ion exchanger 2, positive ion such as calcium ion absorbed by the positive ion exchanger 2 at the time of water softening processing exchanges ion with respect to the produced hydrogen ion, and is desorbed from the positive ion exchanger 2. According to this, the positive ion exchanger 2 is regenerated.

In the negative ion exchanger 3, negative ion such as carbonate ion absorbed by the negative ion exchanger 3 at the time of water softening processing exchanges ion with respect to hydroxide ion produced by disassociation of water, and the negative ion is desorbed from the negative ion exchanger 3. According to this, the negative ion exchanger 3 is regenerated. By applying voltage of polarities opposite from those at the time of water softening processing to both the sides of the ion exchanger 1 in this manner, water is disassociated and the ion exchanger 1 is regenerated.

Here, since the ion exchanger 1 is composed of fine particles of ionic exchange resin, it is possible to obtain large contact areas between the particles of ionic exchange resins in the interface 10 of the positive ion exchanger 2 and the negative ion exchanger 3. Hence, water is disassociated efficiently, and current flowing between the electrodes is increased. Hence, regeneration processing of ion exchanger can be carried out with low voltage.

If voltage is applied to the ion exchanger 1 and the ion exchanger 1 is regenerated during constant dime, water including hardness component discharged into the water treatment device 20 is discharged outside of the hot water supply device 31 through the drain pipe 33b. The ion exchanger 1 is regenerated in this manner.

The regeneration processing of the ion exchanger 1 may be carried out while continuously flowing water in the state where the valves 39 and 40 are opened as described above, but the regeneration processing may be carried out by batch operation in the following manner.

That is, the valves 39 and 40 are closed in a state where water exists in the water treatment device 20, voltage is applied to the ion exchanger 1 for constant time, and the regeneration processing is executed. Thereafter, the valves 39 and 40 are opened, a constant amount of water is made to flow from the hot water tank 32 into the water treatment device 20, and water after regeneration is discharged out through the drain pipe 33b. It is also possible to carry out regeneration processing of the water treatment device 20 by repeating such steps several times.

If the ionic exchange resin is regenerated by the batch operation in this manner, an amount of water discharged at the time of regeneration can be reduced. Further, since the ion exchanger 1 can be regenerated when the heating operation is stopped, it is unnecessary to stop the heating operation for the regeneration processing. Further, since it is possible to carry out both the water softening processing and regeneration processing using the water treatment device 20 alone, configuration of the device is simple, and the device can be made compact.

According to the hot water supply device 31 of the sixth embodiment, the valves 37 and 38 are opened and the valves 39 and 40 are closed at the time of the water softening processing. Hence, processing water flowing at the time of the water processing does not flows out from the second water inlet 23 and the second water outlet 24.

Since the filter 35 is provided upstream of the water treatment device 20 in the hot water supply device 31 of the sixth embodiment, it is possible to remove insoluble material in water.

Hence, it is possible to prevent the ion exchanger 1 from being deteriorated. Further, the activated carbon 36 is provided upstream of the water treatment device 20. Hence, it is possible to remove free chlorine included in water, and to suppress deterioration of the ion exchanger 1.

(Seventh Embodiment)

A seventh embodiment of the present invention will be described below. In the seventh embodiment, the same symbols are allocated to the same members as those of other embodiments, and detailed explanation thereof will be omitted.

A hot water supply device according to the seventh embodiment of the invention includes the water treatment device of the fourth or fifth embodiment.

The hot water supply device of the seventh embodiment will be described in detail below with reference to FIG. 9.

FIG. 9 is a schematic diagram showing outline configuration of the hot water supply device according to the seventh embodiment.

As shown in FIG. 9, the hot water supply device 31 of the seventh embodiment includes a water treatment device 20, a hot water tank 32 and water heating means 34. The hot water tank 32 and the water heating means 34 are annularly connected to each other through a pipe 41. Through the pipe 41, water flows out from a lower portion of the hot water tank 32, and hot water heated by the water heating means 34 flows into an upper portion of the hot water tank 32.

A water supply pipe 42 is connected to a lower portion of the hot water tank 32, and one end of a hot water supply pipe 43 is connected to an upper portion of the hot water tank 32. The other end of the hot water supply pipe 43 is connected to a mixing valve 44.

A downstream end of a mixing pipe 45 branched from the water supply pipe 42 is connected to the mixing valve 44, and an upstream end of the mixing pipe 45 is connected to a halfway portion of the water supply pipe 42.

The mixing valve 44 mixes high temperature hot water in the hot water tank 32 supplied from the hot water supply pipe 43 and water supplied from the water supply pipe 42 with each other. The high temperature hot water in the hot water tank 32 and the water supplied from the water supply pipe 42 are mixed with each other by the mixing valve 44 such that temperature of the mixed water becomes equal to freely set temperature, and the mixture is supplied to a hot water supply terminal through a mixture flow path 46.

A filter 35, an activated carbon 36 and the water treatment device 20 are provided in the water supply pipe 42 at locations upstream of a portion thereof to which the mixing pipe 45 is connected. The filter 35, the activated carbon 36 and the water treatment device 20 are provided in this order from the upstream side with respect to the flowing direction of water.

A valve 38 is provided between a first water outlet 22 of the water treatment device 20 and the branched portion of the mixing pipe 45.

A branch pipe 48 branches off from the water supply pipe 42 between the activated carbon 36 and a first water inlet 21. The branch pipe 48 is connected to the second water inlet 23 of the water treatment device 20. The branch pipe 48 is provided with a valve 39. A valve 37 is provided between the branched portion of the branch pipe 48 and the first water inlet 21.

A drain pipe 47 is connected to a second water outlet 24 of the water treatment device 20, and the drain pipe 47 is provided with a valve 40.

According to the hot water supply device 31 of the seventh embodiment, water after it is softened by the water treatment device 20 is stored in the hot water tank 32. Hence, water after it is softened is supplied from the mixing pipe 45 to the mixture flow path 46. Hence, it is possible to restrain scale from adhering to the entire pipe of the hot water supply device 31.

Although one water treatment device 20 is used in the seventh embodiment, the present invention is not limited to this configuration, and a plurality of water treatment devices 20 may be used.

When one water treatment device 20 is used, the regeneration processing of the water treatment device 20 is carried out when the heating operation is stopped. When two water treatment devices 20 are used, water softening processing is carried out by one of the water treatment devices 20, and the regeneration processing is carried out by the other water treatment device 20. According to this, the water softening processing can continuously be carried out using any one of the water treatment devices 20.

INDUSTRIAL APPLICABILITY

According to the present invention, it is possible to efficiently process hardness component of a large amount of water, and the device can be made compact. Therefore, the invention is useful as a water treatment device for removing hardness component, a washing machine and a hot water supply device.

EXPLANATION OF SYMBOLS 1 ion exchanger
2 positive ion exchanger
3 negative ion exchanger
4 positive ionic exchange resin particles
5, 7 binder particles
6 negative ionic exchange resin particles
11 two-layer composition
12a first positive ion exchanger
12b second positive ion exchanger
13a first negative ion exchanger
13b second negative ion exchanger
18 through hole
20 water treatment device
21 processed water inlet (water inlet)
22 processed water outlet (water outlet)
23 regenerated water inlet (water inlet)
24 regenerated water outlet (water outlet)
25 casing
26 positive electrode (electrode)
27 negative electrode (electrode)
31 hot water supply device

The invention claimed is:

1. An ion exchanger comprising:
a porous positive ion exchanger having binder particles and particles of positive ion exchange resin which adheres positive ions, wherein the positive ion exchanger is formed into a sheet shape; and
a porous negative ion exchanger having binder particles and particles of negative ion exchange resin which adheres negative ions, wherein the positive ion exchanger is formed into a sheet shape, wherein
the positive ion exchanger includes a first positive ion exchange layer bonded to the negative ion exchanger to form the interface, and a second positive ion exchange layer laminated on a surface of the first positive ion exchange layer opposite from the interface,
the negative ion exchanger includes a first negative ion exchange layer bonded to the positive ion exchanger to form the interface, and a second negative ion exchange layer laminated on a surface of the first negative ion exchange layer opposite from the interface,
an ion exchange capacity of the negative ion exchanger is greater than that of the positive ion exchanger, wherein
the ion exchange capacity of the second positive ion exchange layer is greater than that of the first positive ion exchange layer, and
the ion exchange capacity of the second negative ion exchange layer is greater than that of the first negative ion exchange layer,
a film thickness of the first positive ion exchange layer is thinner than that of the second positive ion exchange layer, and
a film thickness of the first negative ion exchange layer is thinner than that of the second negative ion exchange layer,
and
the second positive ion exchange layer, the first positive ion exchange layer, the first negative ion exchange layer and the second negative ion exchange layer are laminated in order.

2. The ion exchanger according to claim 1, wherein particle diameter of the positive ion exchange resin included in the first positive ion exchange layer is smaller than that of the positive ion exchange resin included in the second positive ion exchange layer, and particle diameter of the negative ion exchange resin included in the first negative ion exchange layer is smaller than that of the negative ion exchange resin included in the second negative ion exchange layer.

3. The ion exchanger according to claim 1, wherein a mixing ratio of the binder particles included in the first positive ion exchange layer is equal to or greater than that of the binder particles included in the second positive ion exchange layer, and a mixing ratio of the binder particles included in the first negative ion exchange layer is equal to or greater than that of the binder particles included in the second negative ion exchange layer.

4. The ion exchanger according to claim 1, wherein an ion exchange capacity of the second negative ion exchange layer is greater than that of the second positive ion exchange layer.

5. The ion exchanger according to claim 1, wherein the positive ion exchanger and the negative ion exchanger include through holes.

6. The ion exchanger according to claim 1, wherein the first positive ion exchange layer and the first negative ion exchange layer include through holes.

7. A water treatment device using the ion exchanger according to claim 1, comprising at least one more ion exchanger, in which
the plurality of ion exchangers are placed between a pair of electrodes, the water treatment device further including:
a casing covering the electrodes and all of the ion exchangers; and
a first water inlet, a second water inlet, a first water outlet and a second water outlet formed in the casing, wherein
the plurality of ion exchangers are placed at a predetermined distance from each other,
the first water inlet and the first water outlet are provided such that water flows in a direction perpendicular to a sheet surface of the ion exchanger, and
the second water inlet and the second water outlet are provided such that water flows in a direction parallel to the sheet surface of the ion exchanger.

8. A water treatment device using the ion exchanger according to claim 1, comprising at least one more ion exchanger, in which
the plurality of ion exchangers are placed between a pair of electrodes, the water treatment device further including:
a casing covering the electrodes and all of the ion exchangers; and
a first water inlet, a second water inlet, a first water outlet and a second water outlet formed in the casing, wherein
the plurality of ion exchangers are placed at a predetermined distance from each other,
the first water inlet and the first water outlet are provided such that water flows in a direction parallel to the sheet surface of the ion exchanger, and
the second water inlet and the second water outlet are provided such that water flows in the direction parallel to the sheet surface of the ion exchanger.

9. A hot water supply device including the water treatment device according to claim 7.

* * * * *